(12) United States Patent
Lassagne et al.

(10) Patent No.: US 12,176,483 B2
(45) Date of Patent: Dec. 24, 2024

(54) SOLID POLYMER ELECTROLYTE INCLUDING CROSSLINKED POLYMER OF LACTONE/CYCLIC CARBONATE, AND METHOD OF PREPARING THE SAME

(71) Applicant: COMMISSARIAT A L'ENERGIE ATOMIQUE ET AUX ENERGIES ALTERNATIVES, Paris (FR)

(72) Inventors: Adrien Lassagne, Grenoble (FR);
Celine Barchasz, Grenoble (FR);
Lionel Picard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 153 days.

(21) Appl. No.: 16/919,374

(22) Filed: Jul. 2, 2020

(65) Prior Publication Data
US 2021/0005928 A1    Jan. 7, 2021

(30) Foreign Application Priority Data
Jul. 4, 2019   (FR) ...................... 19 07490

(51) Int. Cl.
*H01M 10/0565* (2010.01)
*C08G 63/08* (2006.01)
(Continued)

(52) U.S. Cl.
CPC ........ *H01M 10/0565* (2013.01); *C08G 63/08* (2013.01); *C08G 63/81* (2013.01);
(Continued)

(58) Field of Classification Search
CPC ......... H01M 10/0565; H01M 10/0525; H01M 10/058; C01G 63/81; C01G 63/823; C01G 64/0208; C01G 64/302
(Continued)

(56) References Cited

U.S. PATENT DOCUMENTS

2002/0102464 A1*  8/2002  Yoshida ................ H01G 11/56
                                                       429/300
2004/0076886 A1*  4/2004  Mori ................... H01M 10/052
                                                       429/317
(Continued)

FOREIGN PATENT DOCUMENTS

| CN | 108923064 A | 11/2018 | |
| EP | 1 347 462 A1 | 9/2003 | |
| JP | 05186548 A * | 7/1993 | ............. C08G 18/00 |

OTHER PUBLICATIONS

Ugur et al., Synthesis by UV-curing and characterisation of polyurethane acrylate-lithium salts-based polymer electrolytes in lithium batteries, 2014, Chemical Papers, 68, 1561-1572 (Year: 2014).*

(Continued)

*Primary Examiner* — Sean P Cullen
(74) *Attorney, Agent, or Firm* — Oblon, McClelland, Maier & Neustadt, L.L.P.

(57) ABSTRACT

A method for preparing a film of solid polymer electrolyte, including: (i) providing a composition including, in one or more solvents, at least one (co)polymer of at least one cyclic monomer selected from lactones and cyclic carbonates with five to eight ring members; the (co)polymer or (co)polymers having free terminal hydroxyl functions; at least one crosslinking agent, at least one ionic conductive salt; and optionally, in the case of a crosslinking agent bearing at least one photosensitive reactive function, at least one photoinitiator compound; (ii) forming a dry film from the composition, in conditions unfavourable to crosslinking of the (co)polymer or (co)polymers; and (iii) bringing the film into conditions favourable to crosslinking of the (co)polymer or (co)polymers to form the film of solid polymer electrolyte. Also disclosed is a film of solid polymer electrolyte and use thereof in an electrochemical system, in particular in a lithium battery.

29 Claims, 9 Drawing Sheets

(51) Int. Cl.
*C08G 63/81* (2006.01)
*C08G 63/82* (2006.01)
*C08G 64/02* (2006.01)
*C08G 64/30* (2006.01)
*H01M 4/02* (2006.01)
*H01M 4/505* (2010.01)
*H01M 4/525* (2010.01)
*H01M 10/0525* (2010.01)
*H01M 10/058* (2010.01)
*H01M 50/403* (2021.01)

(52) U.S. Cl.
CPC ....... *C08G 63/823* (2013.01); *C08G 64/0208* (2013.01); *C08G 64/302* (2013.01); *H01M 4/505* (2013.01); *H01M 4/525* (2013.01); *H01M 10/0525* (2013.01); *H01M 10/058* (2013.01); *H01M 50/403* (2021.01); *H01M 2004/027* (2013.01); *H01M 2300/0082* (2013.01); *H01M 2300/0085* (2013.01)

(58) Field of Classification Search
USPC .......................... 429/303, 304, 306, 317, 322
See application file for complete search history.

(56) References Cited

U.S. PATENT DOCUMENTS

| | | | | |
|---|---|---|---|---|
| 2011/0183567 | A1* | 7/2011 | Vedula | D01F 6/70 264/211.12 |
| 2011/0300450 | A1* | 12/2011 | Balaji | H01M 10/0565 429/303 |
| 2015/0037652 | A1* | 2/2015 | Kim | H01M 50/451 429/144 |
| 2016/0133949 | A1* | 5/2016 | Madabusi | H01M 50/411 429/508 |
| 2019/0157711 | A1* | 5/2019 | Makino | H01B 1/06 |

OTHER PUBLICATIONS

"Gel." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1250347. (Year: 2010).*

"Gel." In A Dictionary of Physics, edited by Rennie, Richard, and Jonathan Law. : Oxford University Press, 2019. https://www.oxfordreference.com/view/10.1093/acref/9780198821472.001.0001/acref-9780198821472-e-1254. (Year: 2019).*

Atkins, Tony, and Marcel Escudier. "gel." In A Dictionary of Mechanical Engineering. : Oxford University Press, 2013. https://www.oxfordreference.com/view/10.1093/acref/9780199587438.001.0001/acref-9780199587438-e-2605. (Year: 2013).*

"Gel." In A Dictionary of Chemistry, edited by Law, Jonathan, and Richard Rennie. : Oxford University Press, 2020. https://www.oxfordreference.com/view/10.1093/acref/9780198841227.001.0001/acref-9780198841227-e-1861. (Year: 2020).*

Schaschke, Carl. "gel." In a Dictionary of Chemical Engineering. : Oxford University Press, 2014. https://www.oxfordreference.com/view/10.1093/acref/9780199651450.001.0001/acref-9780199651450-e-1290. (Year: 2014).*

Mindemark et al., "High-performance solid polymer electrolytes for lithium batteries operational at ambient temperature", Journal of Power Sources, 28, 2015, pp. 166-170.

* cited by examiner

SOLID POLYMER ELECTROLYTE INCLUDING CROSSLINKED POLYMER OF LACTONE/CYCLIC CARBONATE, AND METHOD OF PREPARING THE SAME

TECHNICAL FIELD

The present invention relates to the preparation of a new solid polymer electrolyte, as well as to the solid polymer electrolyte thus obtained.

Electrolytes of this kind can be used in various electrochemical systems or devices, and notably in lithium batteries.

PRIOR ART

Conventionally, the operating principle of an electrochemical generator is based on the insertion and withdrawal, also called "deinsertion", of an alkali metal ion or of a proton, into and from the positive electrode, and the deposition or extraction of this ion, onto and from the negative electrode.

The main systems use the lithium cation as the ionic species for transport. In the case of a lithium battery, for example, the lithium cation extracted from the positive electrode during battery charging will be deposited on the negative electrode, and conversely it is extracted from the negative electrode and then inserted in the positive electrode during discharging. Transport of the proton or of the alkali-metal or alkaline-earth cation, in particular of the lithium cation, between the positive electrode and the negative electrode, is provided by an ionic conductive electrolyte.

The formulation of the electrolyte used is an essential factor for the performance of the electrochemical system, especially when the latter is used at temperatures that are very low or very high. The ionic conductivity of the electrolyte notably determines the efficiency of the electrochemical system, since it has an influence on the mobility of the ions between the positive and negative electrodes.

Other parameters also influence the choice of the electrolyte used. This relates notably to its thermal, chemical or electrochemical stability within the electrochemical system, as well as economic, safety and environmental protection criteria, including notably the toxicity of the electrolyte.

Generally, the electrolytes of electrochemical systems are in liquid, gel or solid form.

Regarding electrolytes in liquid form, the conventional electrolytes of electrochemical generators with a metal cation from one of the first two columns of the periodic table, for example lithium, are compounds of a salt of this cation dissolved in an organic or aqueous medium (conventionally in carbonate solvents, acetonitrile for lithium batteries), in the presence or absence of additives.

For example, the conventional supercapacitor electrolytes consist of an organic salt (conventionally a tetraethylammonium tetrafluoroborate salt $Et_4N-BF_4$) dissolved in acetonitrile.

However, their use in a complete system for electrochemical storage, for example in an Li-ion battery, requires adding a separator to ensure electrical isolation between the positive and negative electrodes. Also, even if these electrolytes display good ionic conductivity, they nevertheless pose problems of safety and cost in the context of using organic solvents (low thermal stability), and of electrochemical stability in the context of using an aqueous medium.

Regarding gel electrolytes, they are liquid electrolytes, for example as described above, trapped in a "host" polymer. The solvent or solvents of the liquid electrolyte must display affinity for the host polymer, neither too high (dissolution of the polymer), nor too low (exudation). The host polymer must allow maximum incorporation of liquid while preserving mechanical properties that guarantee physical separation between the two electrodes.

Finally, to address the problems of safety connected with the presence of the solvent, it has been proposed to use solvent-free solid polymer electrolytes. These polymers included in the composition of the electrolyte must have good properties of ionic conduction so that they can be used satisfactorily in systems for electrochemical generation and storage.

The polymer electrolytes most widely used for lithium-based electrochemical devices are based on polyether, and more particularly poly(oxyethylene) (POE), in which an alkali-metal or alkaline-earth salt is dissolved (depending on the chemistry of the electrodes). However, these electrolytes have limited performance with respect to ionic conductivity associated with the mechanism of cation transport, called "assisted", and require a high operating temperature (60° C. to 80° C.). The polymers are thus conductive in a molten physical state.

Various studies have been conducted with a view to improving the ionic conduction performance of polymer electrolytes.

It has for example been proposed to develop POE derivatives made amorphous by copolymerization, copolymers with flexible side chains based on POE and polysiloxane, or else polysiloxane-based copolymers that have grafted POE chains. In general, improvement of ionic conduction performance is unfortunately achieved at the expense of the mechanical integrity of the solid polymer electrolyte.

Mindemark et al. [1] propose for example a polymer electrolyte based on poly(ε-caprolactone) (PCL)/poly(trimethylene carbonate) (PTMC) copolymer. In particular, this work reports that incorporation of carbonate units in poly(ε-caprolactone) (PCL) polymer chains makes it possible, by suppressing the crystallinity of the polyester, to increase the ionic conductivity of the solid electrolyte material. The film of solid electrolyte based on PCL/PTMC (80/20 by weight) was tested in a lithium battery between a negative electrode of metallic lithium and a positive electrode of $LiFePO_4$. However, the use of a positive electrode of $LiFePO_4$ reduces the energy density of the battery considerably, compared for example to the use of an electrode of the $LiCoO_2$ type. Moreover, these electrolytes have poor mechanical stability when they are heated to a temperature greater than or equal to their melting point; they are then no longer solid, but in the form of viscous liquids. Finally, as illustrated in cycling tests in the $Li^0$ vs. $LiNi_{1/3}Mn_{1/3}Co_{1/3}O_2$ battery, presented in example 1, the mechanical durability of these solid electrolytes based on PCL/PTMC is insufficient to block the phenomenon of lithium dendrite growth, and therefore the risks of short-circuiting of the battery.

Moreover, document EP 1 347 462 describes the formation of an electrolyte of the gel type starting from a resin composition comprising a hardenable monomer having reactive groups of the (meth)acrylate type, for example a monomer of the caprolactone type modified with dipentaerythritol hexaacrylate, a plasticizer and an electrolyte salt. The electrolyte obtained, having a resin/plasticizer weight ratio of the order of 1/9, is a gel electrolyte, the plasticizer more commonly being called solvent in the context of electrolytes of this kind.

For obvious reasons, improvement of the performance of the electrolytes is a constant objective.

SUMMARY OF THE INVENTION

The present invention aims precisely to provide new solid polymer electrolytes, combining excellent performance in terms of ionic conductivity, without adding plasticizers, and mechanical stability.

More particularly, it relates, according to a first of its aspects, to a method for preparing a film of solid polymer electrolyte, comprising at least the following steps:
(i) providing a composition, comprising, in one or more solvents:
  at least one (co)polymer of at least one cyclic monomer selected from lactones and cyclic carbonates with five to eight ring members; said (co)polymer or (co)polymers having free terminal hydroxyl functions (—OH);
  at least one organic molecule, called "crosslinking agent", bearing at least two reactive functions, said molecule being able to allow, under the action of external stimulation, in particular under the action of heat and/or UV radiation, crosslinking of said (co)polymer or (co)polymers by reaction with the hydroxyl functions of said (co)polymer or (co)polymers;
  at least one ionic conductive salt, in particular a lithium salt; and
  optionally, in the case of a crosslinking agent bearing at least one photosensitive reactive function, at least one photoinitiator compound;
(ii) forming a dry film from said composition, in conditions unfavourable to crosslinking of said (co)polymer or (co)polymers; and
(iii) bringing said film into conditions favourable to crosslinking of said (co)polymer or (co)polymers to form the film of solid polymer electrolyte.

According to a variant embodiment, the film of solid polymer electrolyte according to the invention may be formed from a (co)polymer of at least one lactone, in particular from at least ε-caprolactone. In particular, the (co)polymer used in step (i) of the method of the invention may be a poly(ε-caprolactone) (PCL) homopolymer, or else a copolymer obtained from ε-caprolactone and a cyclic carbonate, for example trimethylene carbonate, notably a poly(ε-caprolactone) (PCL)/poly(trimethylene carbonate) (PTMC) copolymer. The invention further relates to a film of solid polymer electrolyte, in particular such as obtained by the method described above, comprising, or even being formed from, a crosslinked polymer network formed from crosslinked (co)polymer(s) of at least one cyclic monomer selected from lactones and cyclic carbonates with five to eight ring members; and at least one ionic conductive salt, in particular a lithium salt.

"Solid electrolyte" means an electrolyte excluding the presence of a component in liquid form, and serving both as separator and as ionic conductor in an electrochemical system.

In particular, the crosslinked polymer network of said solid polymer electrolyte forms more than 50 wt %, in particular more than 75 wt %, of the total weight of said solid electrolyte.

Advantageously, the film of solid polymer electrolyte according to the invention is free from plasticizers, such as carbonates, for example ethylene carbonate or diethyl carbonate. In particular, the film of solid polymer electrolyte according to the invention is different from an electrolyte of the gel type, comprising a major amount of plasticizer, more commonly called solvent.

The solid electrolyte according to the invention may be used in a great many electrochemical systems, such as generators, in particular lithium batteries.

The solid polymer electrolyte obtained according to the invention proves advantageous in several respects.

Thus, it has excellent performance in terms of ionic conductivity, even in the absence of additives. In particular, advantageously it has ionic conductivity, measured at 25° C., greater than or equal to $10^{-6}$ S·cm$^{-1}$, in particular greater than or equal to $5.10^{-6}$ S·cm$^{-1}$. Moreover, it has ionic conductivity, measured at 60° C., greater than or equal to $10^{-5}$ S·cm$^{-1}$, in particular greater than or equal to $3.10^{-5}$ S/cm$^{-1}$.

Furthermore, the polymer network of a solid electrolyte according to the invention has good stability, even at high temperatures, in particular up to 150° C. The solid polymer electrolyte obtained according to the invention thus has good thermal and electrochemical stability, thus making it possible to use high operating temperatures of the electrochemical system in which it is used.

Advantageously, as illustrated in the examples given hereunder, the solid polymer electrolyte according to the invention may advantageously be used in batteries with high energy density, such as Li$^0$ vs. LiNi$_{1/3}$Mn$_{1/3}$Co$_{1/3}$O$_2$ batteries, without affecting the thermal and electrochemical stability of the electrolyte, in particular limiting the phenomenon of lithium dendrite growth and the associated risks of short-circuiting.

According to another of its aspects, the invention further relates to the use of a film of solid polymer electrolyte according to the invention in an electrochemical system, in particular in a lithium battery, notably a lithium-metal battery.

It further relates to an electrochemical system, in particular a lithium battery, comprising a film of solid polymer electrolyte according to the invention, in particular as obtained by the method described above.

Other features, variants and advantages of the solid polymer electrolyte according to the invention, and of its preparation, will become clearer on reading the description, examples and figures presented hereunder, given for purposes of illustration, and not limiting the invention.

Figure 1:
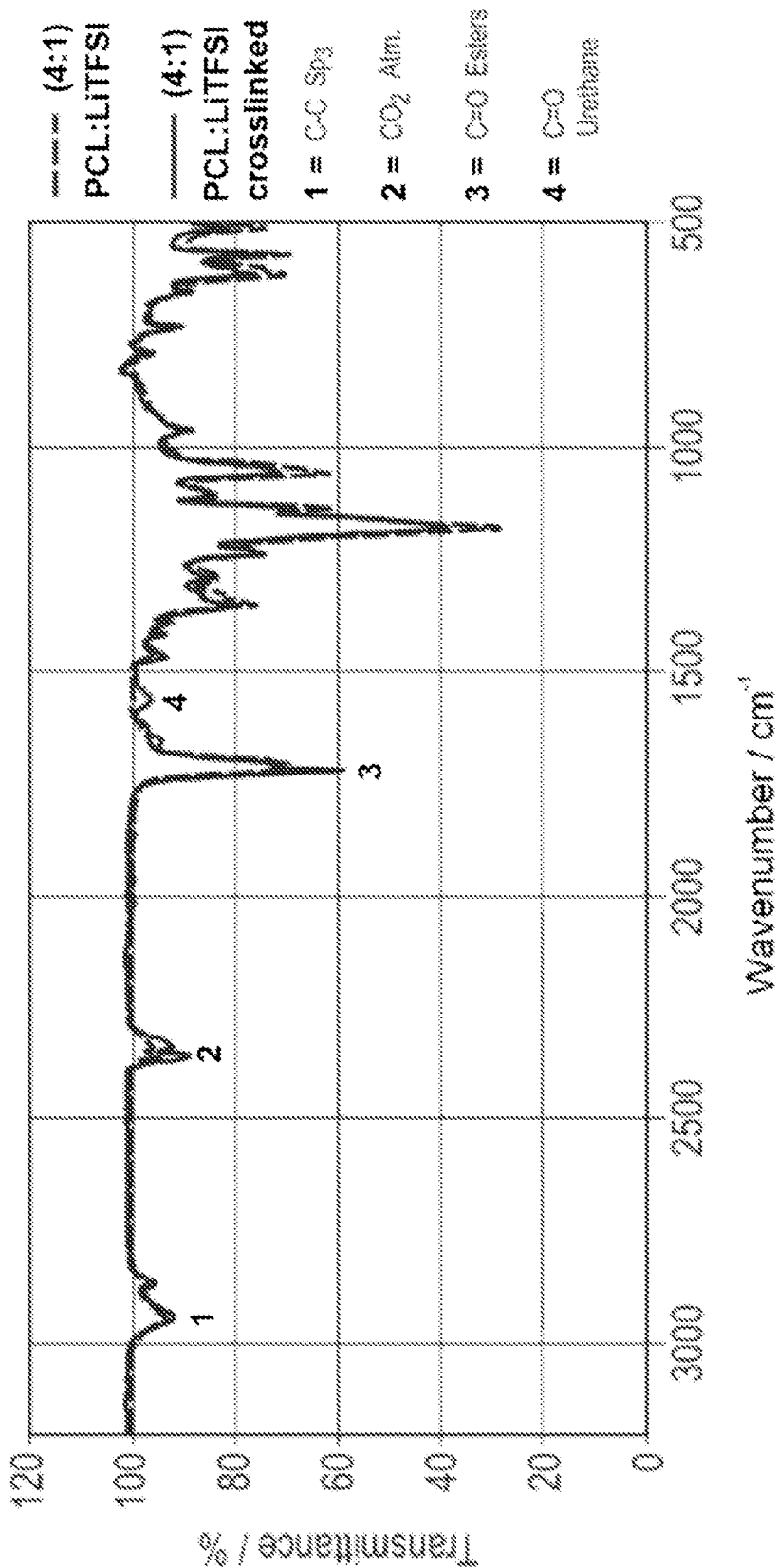
FIG. 1 presents the infrared spectra, respectively of the electrolyte based on crosslinked polycaprolactone according to the invention ("crosslinked PCL:LiTFSI (4:1)") and of the electrolyte based on non-crosslinked polycaprolactone ("PCL:LiTFSI (4:1)") not according to the invention, prepared according to example 1.

Hereinafter, the expressions "between . . . and . . . " and "ranging from . . . to . . . " and "varying from . . . to . . . " are equivalent and are intended to signify that the limits are included, unless stated otherwise.

DETAILED DESCRIPTION

Precursor Composition of the Solid Electrolyte

As stated above, preparation of a solid polymer electrolyte according to the invention involves, firstly, preparation of a composition comprising, in one or more solvents:
- at least one (co)polymer of at least one cyclic monomer selected from lactones and cyclic carbonates with five to eight ring members; said (co)polymer or (co)polymers having free terminal hydroxyl functions;
- at least one crosslinking agent, capable of allowing, under the action of external stimulation, in particular under the action of heat and/or UV radiation, crosslinking of said (co)polymer or (co)polymers by reaction with the hydroxyl functions; and
- at least one electrolyte salt, in particular a lithium salt.

The composition used in step (i) of the method of the invention is denoted more simply by the designation "precursor composition of the solid electrolyte".

(Co)Polymer Bearing Hydroxyl Functions

"Copolymer" means in particular a polymer derived from at least two different monomer species.

In the present description, unless stated otherwise, the term "polymer" will be used to denote, in the broad sense, both homopolymers and copolymers.

The polymer used according to the invention is more particularly a branched polymer. "Branched" denotes a non-linear polymer possessing pendent chains.

As detailed hereafter, the (co)polymer bearing terminal hydroxyl functions (—OH) may be obtained more particularly, before carrying out the method of the invention, by (co)polymerization of one or more cyclic monomers selected from lactones and cyclic carbonates with five to eight ring members, in the presence of at least one organic molecule, called "initiator", bearing at least three hydroxyl functions and, optionally, in the presence of at least one catalyst of the (co)polymerization reaction.

The cyclic monomers correspond more particularly to the following formula (I):

[Chem 1]

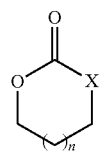

(I)

in which:
X represents a carbon atom or an oxygen atom;
n has a value of 0 or is an integer between 1 and 9, in particular between 1 and 3;
said monomers optionally being substituted, on one or more of the carbon atoms of the ring, with one or more substituents R.

The substituents of the cyclic monomer, R, may be selected more particularly from alkyl groups, in particular $C_1$ to $C_5$, linear or branched, saturated or unsaturated; halogen atoms; hydroxyl function, carboxyl function, —$SO_3H$ and amine, in particular —$NH_2$; said alkyl groups optionally bearing one or more groups selected from halogen atoms, hydroxyl functions, carboxyl functions, —$SO_3H$ and amine, in particular —$NH_2$. They may be for example (meth)acrylate groups.

According to a particular embodiment, the (co)polymer is formed from at least one monomer of the lactone type.

"Lactone" means more particularly monomers corresponding to the following formula (II):

[Chem 2]

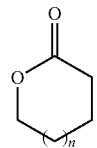

(II)

in which n is an integer from 1 to 9, in particular from 1 to 3;
said monomers optionally being substituted, on one or more of the carbon atoms of the ring, with one or more substituents R, as defined above.

Examples of lactones comprising more particularly the β-, γ-, δ- and ε-lactones, saturated or unsaturated, substituted or unsubstituted, comprising from 4 to 11 carbon atoms, such as ε-caprolactone, δ-valerolactone, γ-butyrolactone, racemic or non-racemic δ-caprolactone, racemic or non-racemic β-butyrolactone.

Thus, the (co)polymer used in step (i) of the method of the invention may be formed from at least one monomer of the aforementioned formula (II).

Preferably, the (co)polymer according to the invention is formed from at least ε-caprolactone.

The cyclic carbonates may more particularly be of the following formula (III):

[Chem 3]

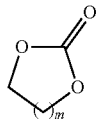

(III)

m being an integer between 1 and 3, preferably m has a value of 1 or 2;

said monomers optionally being substituted, on one or more of the carbon atoms of the ring, with one or more substituents R as defined above.

As an example of cyclic carbonate monomer, we may mention trimethylene carbonate and derivatives thereof.

According to a particular embodiment, the polymer according to the invention may be a homopolymer formed from a monomer of the lactone type, for example a poly(ε-caprolactone) (PCL) homopolymer.

According to another variant embodiment, the polymer according to the invention is a copolymer obtained from at least one monomer of the lactone type, for example ε-caprolactone and at least one monomer of the cyclic carbonate type, for example trimethylene carbonate. As an example, it may be a poly(ε-caprolactone) (PCL)/poly(trimethylene carbonate) (PTMC) copolymer.

Preparation of the (Co)Polymer

Initiator

As stated above, the (co)polymerization reaction, for arriving at the polymer functionalized with free hydroxyl functions, is carried out in the presence of an organic molecule, called "initiator", bearing at least three hydroxyl functions.

"Initiator" denotes, according to the invention, an organic molecule comprising at least three hydroxyl functions (—OH).

Preferably, the initiator is an organic molecule having from three to five hydroxyl functions, preferably three or four hydroxyl functions, and in particular three hydroxyl functions.

As examples of said initiator molecule, we may mention for example pentaerythritol or glycerol.

The initiator may more particularly have a number-average molecular weight from 90 to 1000 g/mol, in particular from 90 to 350 g/mol.

At the end of (co)polymerization, the initiator will be integrated with the macromolecular chain. At the end of (co)polymerization, the (co)polymer chains thus have terminal hydroxyl functions.

The initiator molecule or molecules may be used in a cyclic monomer(s)/initiator(s) molar ratio between 1/30 and 1/10000, in particular between 1/300 and 1/4000.

Catalyst

The ring-opening (co)polymerization reaction of the monomers of the lactone and/or cyclic carbonate type may advantageously be catalysed.

A person skilled in the art is able to select the catalysts that are suitable for the ring-opening (co)polymerization reaction. Examples of catalysts for the copolymerization of carbonates and of functionalized lactones are described for example in work [2].

They may be for example a substituted phosphorus-containing compound, such as diphenyl phosphate (DPP), or else metal compounds such as tin diethylhexanoate $(Sn(Oct)_2)$.

Said catalyst or catalysts may be used in a molar ratio of catalyst/hydroxyl functions of the initiator, between 4/1 and 1/10, in particular between 1/1 and 1/3.

A person skilled in the art is able to adjust the operating conditions of the (co)polymerization reaction.

The monomer or monomers of the lactone and/or cyclic carbonate type may be used at a rate from 90 to 99 wt %, in particular from 95 to 99 wt %, relative to the total weight of the mixture of monomer(s), initiator(s) and catalyst(s).

In particular, the (co)polymerization reaction may be carried out at a temperature from 20 to 110° C., in particular from 40 to 80° C.

The polymerization time may be between 2 hours and 4 days, in particular between 1 and 2 days.

The reaction is preferably carried out with stirring in a solvent medium or in the bulk.

It may be carried out continuously, semi-continuously or discontinuously in a reactor.

Preferably, the reaction is carried out in a solvent medium, typically formed from one or more non-polar aprotic solvents, in particular selected from toluene, dichloromethane, tetrahydrofuran and mixtures thereof, preferably in toluene.

At the end of (co)polymerization, the (co)polymer may be submitted to one or more purification steps, for example by precipitation in one or more polar solvents, typically methanol, and recovered by filtration.

The (co)polymer obtained according to the invention advantageously has a number-average molecular weight, designated Mn, greater than or equal to 3 kg·mol⁻¹, in particular between 9 and 120 kg·mol⁻¹ and more particularly between 30 and 80 kg·mol⁻¹.

The number-average molecular weight may be measured by gel permeation chromatography (GPC). It may be monitored from the molar ratio of said monomer or monomers to the initiator.

Preferably, the (co)polymer synthesized according to the invention may have a polydispersity index, reflecting good uniformity of chain lengths of the (co)polymer, less than or equal to 2, preferably less than or equal to 1.5.

Said (co)polymer or (co)polymers may represent more than 70 wt %, in particular more than 80 wt % and notably more than 90 wt %, of the total weight of the composition in step (i) of the method of the invention, except solvent(s).

Crosslinking Agent

The composition used in step (i) of the method of the invention comprises at least one organic molecule, called "crosslinking agent".

"Crosslinking agent" denotes, in the sense of the invention, an organic molecule bearing at least two reactive functions, capable of allowing, under the action of external stimulation, in particular under the action of heat and/or UV radiation, crosslinking of the (co)polymer as defined above.

More particularly, the crosslinking agent used according to the invention may be selected from:

organic molecules, called "thermo-activatable", having at least two reactive functions, designated F1, each of the functions being able to interact, under the action of heat, with a hydroxyl function to form a covalent bond;

organic molecules, called "photo-activatable", having a function F1 able to interact, under the action of heat, with a hydroxyl function to form a covalent bond; and at least one photosensitive function F2, reactive under the action of UV radiation, in the presence of at least one photoinitiator compound.

It is to be understood that said molecule or molecules used as crosslinking agent are soluble in the solvent medium of the composition of (co)polymers used in step (i) of the method of the invention.

"Soluble" signifies that, in the application conditions, it is possible to dissolve said crosslinking agent at a rate of at least 1 g per 100 g of solvent medium.

According to a particular embodiment, the crosslinking agent used according to the invention may be of the following formula (IV):

F1-E-G        (IV), in which:
F1 is a function able to interact, under the action of heat, with a hydroxyl function to form a covalent bond;
E is an organic spacer group; and
G represents either a function F1, identical to or different from the first function F1; or a photosensitive function F2, reactive under UV radiation.

The organic spacer group E may be more particularly a single bond or a hydrocarbon-containing group, in particular comprising from 1 to 20 carbon atoms, and optionally comprising one or more unsaturations and/or one or more heteroatoms.

Advantageously, the spacer group E is of low steric hindrance. Low steric hindrance of the crosslinking agents makes it possible to increase their reactivity with the hydroxyl functions of the (co)polymer or (co)polymers, and thus reduce the duration of the crosslinking step of said (co)polymer or (co)polymers.

In particular, E represents an alkylene group, linear or branched, preferably linear, having from 2 to 8 carbon atoms, preferably from 2 to 6 carbon atoms.

The function F1 is activatable under the effect of an external stimulus, in particular under the action of heat, to create a covalent bond after reaction with a hydroxyl function.

Preferably, by reacting with a hydroxyl function, the function F1 is able to establish a covalent bond of the urethane type.

In particular, the function F1 may be an isocyanate function (—N=C=O).

According to a first variant embodiment, said crosslinking agent is an organic molecule having at least two functions, designated F1, preferably two functions F1, each of the functions being able to interact with a hydroxyl function to form a covalent bond, under the effect of external stimulation, in particular under the action of heat.

In particular, said organic molecule, used as a crosslinking agent, may be of the aforementioned formula (IV), in which G represents a function F1, identical to or different from the first function F1, preferably identical.

Preferably, said functions F1 are isocyanate functions.

A crosslinking agent of this kind is able to allow, under the action of heat, the crosslinking of the (co)polymer as defined above, by interaction of the isocyanate functions with the pendent hydroxyl functions of said (co)polymer or (co) polymers.

"Thermo-activatable" crosslinking agent denotes a crosslinking agent that requires the action of heat to lead to crosslinking of the (co)polymer.

Thus, according to a particular embodiment, the method of the invention employs, as crosslinking agent, at least one organic molecule bearing at least two isocyanate functions, in particular bearing two isocyanate functions.

Preferably, the crosslinking agent is selected from the aliphatic diisocyanates. For example, the following may be mentioned as aliphatic diisocyanate compound: hexamethylene diisocyanate (HDI), isophorone diisocyanate (IPDI), bis(4-isocyanatocyclohexyl)methane ("hydrogenated MDI", $H_{12}MDI$), hydrogenated xylylene diisocyanate ($H_6XDI$) and m-tetramethylxylylene diisocyanate (TMXDI).

According to a particular embodiment, the crosslinking agent is hexamethylene diiosocyanate.

According to a particular embodiment, the crosslinking agent is used in the composition of said (co)polymer or (co)polymers, in conjunction with at least one catalyst of the coupling reaction between a hydroxyl function and the function F1, in particular isocyanate.

Said catalysts may be selected more particularly from the tertiary amines such as 1,4-diazabicyclo[2.2.2]octane (DABCO), 1-azabicyclo[2.2.2]octane (quinuclidine), 1,8-diazabicyclo[5.4.0]undec-7-ene (DBU, CAS: 6674-22-2), 1,5-diazabicyclo[4.3.0]non-5-ene (DBN, CAS: 3001-72-7), 3,3,6,9,9-pentamethyl-2,10-diazabicyclo[4.4.0]dec-1-ene, tin chloride, organometallic compounds such as metal acetonylacetates, organometallic tin compounds, calcium hexanoate, calcium 2-ethylhexanoate, calcium octanoate and calcium linoleate, dibutyltin dilaurate (DBTDL, CAS: 75-58-7), bismuth tris(2-ethylhexanoate) and zinc bis(2-ethylhexanoate), sulphonimides, such as bis(trifluoromethane)sulphonimide (TFMI, CAS: 82113-65-3), sulphonic acids, such as trifluoromethanesulphonic acid (triflic acid), p-toluenesulphonic acid (PTSA, CAS: 104-15-4) and methanesulphonic acid (MSA, CAS: 75-75-2), phosphated derivatives, such as diphenyl phosphate (DPP, CAS: 838-85-7).

Preferably the catalyst is selected from 1,4-diazabicyclo [2.2.2]octane (DABCO), 1,8-diazabicyclo[5.4.0]undec-7-ene (DBU), 1,5-diazabicyclo[4.3.0]non-5-ene (DBN), dibutyltin dilaurate (DBTDL), bis(trifluoromethane), triflic acid, p-toluenesulphonic acid (PTSA), methanesulphonic acid (MSA) and diphenyl phosphate (DPP).

According to a particular embodiment, the catalyst is dibutyltin dilaurate (DBTDL).

Said catalyst or catalysts may be used at a rate of 0.1 to 5 wt %, preferably from 0.5 to 1 wt %, relative to the total weight of the composition.

According to another variant embodiment, said crosslinking agent is an organic molecule possessing a function F1 able to interact, under the action of heat, with a hydroxyl function to form a covalent bond, in particular an isocyanate function; and at least one function F2 that is reactive under UV radiation.

"Photo-activatable" crosslinking agent denotes a crosslinking agent that requires the action of UV radiation, to lead to crosslinking of the (co)polymer.

Said function or functions F2 may be selected more particularly from so-called photosensitive functions, able to react under the action of UV radiation and in the presence of a "photo-initiating" compound (or "photoinitiator").

These photosensitive functions are familiar to a person skilled in the art. They may be for example functions with ethylenic unsaturation(s).

"Function with ethylenic unsaturation(s)" means a radical containing at least one unsaturated ethylene function, photo- or thermo-polymerizable.

Preferably, the function with ethylenic unsaturation(s) is selected from the (meth)acrylate and allyl functions.

In particular, said organic molecule, used as crosslinking agent, may correspond to the aforementioned formula (IV), in which F1 is as defined above, in particular F1 represents an isocyanate function; and G represents a function F2, in particular a function with ethylenic unsaturation(s), in particular a (meth)acrylate or allyl function.

As an example, the crosslinking agent may be methacryloyloxyethyl isocyanate.

According to a particular embodiment, when using a crosslinking agent bearing at least one photosensitive function F2, the crosslinking agent is used in the composition of said (co)polymer or (co)polymers in conjunction with at least one photoinitiator.

"Photoinitiator" denotes a chemical compound which, under the action of UV radiation, makes it possible to activate the reaction of a function F2 with another function F2.

As an example, we may mention radical photoinitiators, such as phosphine oxides, for example diphenyl(2,4,6-trimethylbenzoyl)phosphine oxide (TPO).

Said photoinitiator compound or compounds are generally used in a molar ratio photoinitiator(s)/photosensitive function(s) of about 1/10.

Said molecule or molecules, used as crosslinking agent, may be commercially available. Alternatively, they may be obtained prior to carrying out the method of the invention.

In particular, said molecule or molecules, used as crosslinking agents and said (co)polymer or (co)polymers may be used in a stoichiometric molar ratio.

Ionic Conductive Salt

The precursor mixture of the solid electrolyte further comprises at least one ionic conductive salt, to provide conduction of ions, such as a lithium salt when the electrolyte is intended for a lithium battery.

It may be a salt of an alkali metal or a salt of an alkaline-earth metal.

The alkali metal salt may be for example a lithium salt or a sodium salt; the alkaline-earth metal salt may be for example a magnesium salt.

As examples of lithium salt, we may mention $LiPF_6$, $LiClO_4$, $LiBF_4$, $LiAsF_6$, $LiCF_3SO_3$, $LiN(C_2F_5SO_2)_2$, lithium bistrifluoromethylsulphonylimide $LiN[SO_2CF_3]_2$ (known by the abbreviation LiTF SI), lithium bis(fluorosulphonyl)amide $LiN[SO_2F]_2$ (known by the abbreviation LiFSI) and mixtures thereof.

Preferably, the electrolyte comprises, as lithium salt, $LiPF_6$ or LiTFSI, preferably LiTFSI. Said salt or salts, for example lithium salt, may be present, in the composition in step (i), in a content from 10 to 80 wt %, in particular from 15 to 30 wt %, relative to the weight of said copolymer or copolymers.

Solvent Medium

It is to be understood that the nature of said solvent or solvents of the precursor composition of the solid electrolyte according to the invention, used in step (i), is selected taking into account the nature of the compounds used, in particular the nature of the crosslinking agent and or of said copolymers.

Said solvent or solvents are more particularly polar organic solvents.

As examples, they may be selected from acetone, tetrahydrofuran (THF) and mixtures thereof.

Preferably, the solvent medium is tetrahydrofuran.

Said solvent or solvents may represent from 50 to 95 wt % of the total weight of said composition, in particular from 75 to 90 wt %.

Preferably, the composition used in step (i) is free from plasticizing additive.

Precursor Film of the Electrolyte

A second step of the method of the invention consists of forming a dry film from the precursor composition of the solid electrolyte.

"Dry" film signifies that the film comprises less than 20 wt % of solvent, in particular less than 10 wt % and more particularly less than 5 wt % of solvent.

The dry film preferably has a thickness between 10 and 200 μm, in particular between 20 and 80 μm.

According to a particular embodiment, the dry film may be formed on the surface of a substrate and then optionally separated from said substrate to form a self-supporting film. The dry film may be obtained by any technique known by a person skilled in the art, for example by a method called casting/evaporation, involving at least the following steps:
depositing said precursor mixture in one or more solvents on the surface of the substrate; and
evaporating said solvent or solvents.

It may also be obtained by coating followed by drying in conditions allowing evaporation of said solvent or solvents.

For example, said solvent or solvents may be evaporated at room temperature by subjecting the mixture deposited on the surface of the substrate to ventilation.

Various kinds of substrate may be used. It may be of glass, alumina or of polypropylene. According to a variant embodiment, the substrate may be one of the electrodes of the electrochemical system for which the solid electrolyte according to the invention is intended.

For example, for preparing a solid electrolyte intended for a lithium battery, the substrate may be a lithiated electrode.

The dry film obtained may optionally be separated from the substrate, to give a self-supporting film.

According to another variant embodiment, especially when the crosslinking agent is selected from photo-activatable organic molecules, as defined above, the precursor composition of said electrolyte may be dried in conditions favourable to removal of said solvent or solvents, and then formed into a film, for example by hot pressing or by extrusion.

When using, as crosslinking agent, one or more organic molecules bearing a function F1, in particular an isocyanate function, and at least one function F2, in particular a (meth)acrylate or allyl function, the composition may be brought, prior to forming, to a temperature favourable to interaction of the functions F1 with the hydroxyl functions of said (co)polymer or (co)polymers, to form covalent bonds.

A person skilled in the art is able to adjust the conditions of evaporation of the solvent or solvents to obtain the desired dry film.

The method of forming the precursor composition of the solid electrolyte according to the invention, to obtain a dry film, and notably the conditions of drying, are selected, notably taking into account the nature of the crosslinking agent, so as not to initiate crosslinking of said copolymer or copolymers according to the invention.

Crosslinking of the Film

Once the dry film has been obtained, it is submitted in step (iii) to conditions favourable to crosslinking of said (co)polymer chain or chains.

It is to be understood that the conditions of crosslinking of said (co)polymer or (co)polymers are adjusted having regard to the nature of said organic molecule or molecules used as crosslinking agent.

Thus, in the case of using a "thermo-activatable" organic molecule, having at least two functions F1, in particular isocyanate, as described above, crosslinking may be carried out in step (iii) by bringing said dry film to a temperature favourable to reaction of the functions F1, in particular isocyanate functions, with the hydroxyl functions of said (co)polymer or (co)polymers.

A person skilled in the art is able to adjust the temperature and the duration of crosslinking, to achieve a sufficient degree of crosslinking to obtain the desired performance for the solid electrolyte.

Thus, the crosslinking in step (iii), by reaction of the isocyanate functions with the hydroxyl functions, may be carried out at a temperature between 60 and 120° C., in particular between 80 and 100° C., and for a time from 5 minutes to 1 hour.

In the case of isocyanate functions F1, the (co)polymer chains according to the invention will thus be linked together, at the end of the crosslinking, via covalent bonds of the urethane type (—NH—C(O)O—).

According to another variant embodiment, in the case of using a "photo-activatable" organic molecule, having a function F1, in particular isocyanate, and at least one photosensitive function F2, activatable in the presence of a photoinitiator compound, for example a (meth)acrylate or allyl function, crosslinking may be carried out in step (iii) by the following step or steps:
  (a) optionally, in the case when the functions F1 did not react during forming of the dry film with the hydroxyl functions of said (co)polymer or (co)polymers, bring said film to a temperature favourable to interaction of said functions F1, in particular isocyanate, with said hydroxyl functions; and
  (b) subject said dry film to UV radiation favourable to activation of the functions F2, in particular (meth) acrylate or allyl, where steps (a) and (b) may be carried out consecutively, in that order, or simultaneously.

In particular, crosslinking under UV radiation may be effected by exposing the dry film to UV radiation of wavelength between 200 and 400 nm.

The duration of crosslinking may be between 30 seconds and 5 minutes, in particular between 30 seconds and 2 minutes.

The crosslinked polymer electrolyte film, obtained at the end of the method of the invention, may if necessary easily be separated from the substrate on which it is formed, to give a self-supporting film of solid electrolyte.

The film of solid electrolyte according to the invention may have a thickness between 10 and 100 μm, in particular between 15 and 60 μm.

Electrochemical System

The solid polymer electrolyte obtained according to the invention may advantageously be used as a solid electrolyte in an electrochemical system.

The electrochemical system may be a system for electrochemical generation, conversion or storage. It may more particularly be a fuel cell, for example a proton exchange membrane fuel cell (PEMFC); a primary or secondary battery, for example a lithium, sodium, magnesium, potassium or calcium battery; a lithium-air or lithium-sulphur accumulator. According to a particular embodiment, the solid electrolyte is used in a battery, in particular in a lithium battery, notably a lithium-ion or lithium-metal battery.

In particular, according to another of its aspects, the invention further relates to an electrode/electrolytic membrane assembly, comprising a crosslinked polymer electrolyte film according to the invention.

An electrochemical system according to the invention generally comprises at least one positive electrode and one negative electrode between which there is a film of solid electrolyte acting both as ionic conductor and separator between the positive and negative electrodes.

The positive electrode of a lithium battery generally comprises, as electrochemically active material, lamellar compounds such as $LiCoO_2$, $LiNiO_2$ and mixed $Li(Ni, Co, Mn, Al)O_2$, or compounds with a spinel structure with compositions close to $LiMn_2O_4$, lithium phosphates, in particular $LiFePO_4$.

Advantageously, the positive electrode comprises, as electrochemically active material, $LiNi_{1/3}Mn_{1/3}Co_{1/3}O_2$ or $LiCoO_2$, preferably $LiNi_{1/3}Mn_{1/3}Co_{1/3}O_2$.

The negative electrode generally comprises, as electrochemically active material, lithium metal in the case of primary accumulators, or intercalation materials such as graphitic carbon, or lithiated titanium oxide ($Li_4Ti_5O_{12}$), in the case of accumulators based on lithium-ion technology.

Advantageously, it may be a lithium-metal battery, comprising an electrode of metallic lithium $Li^0$ and an electrode comprising $LiNi_{1/3}Mn_{1/3}Co_{1/3}O_2$ or $LiCoO_2$, preferably $LiNi_{1/3}Mn_{1/3}Co_{1/3}O_2$.

The invention will now be described by means of the following examples and figures, given of course for purposes of illustration, and not limiting the invention.

EXAMPLE

Example 1

1.1. Preparation of the Solid Electrolytes
Preparation of the Polyester (Polycaprolactone) Functionalized with Hydroxyl Functions A 50-mL flask is charged with 20 mg of pentaerythritol ($1.47\times10^{-4}$ mol; 1 equivalent), 10 g of ε-caprolactone ($8.77\times10^{-2}$ mol; 597 equivalents), 100 mg of diphenyl phosphate ($4\times10^{-4}$ mol; 2.72 equivalents) and dissolved in 10 mL of toluene. The whole is placed under argon, with mechanical stirring, at 50° C. for 48 hours.

The mixture is cooled to room temperature, and then diluted with 50 mL of tetrahydrofuran (THF), before being precipitated in methanol (500 mL). After filtration, the precipitate is dried under vacuum at 40° C. for 48 hours.
Formation of the Film of Solid Electrolyte 400 mg of the synthesized polycaprolactone is dissolved in 2 mL of tetrahydrofuran (THF), in the presence of 100 mg of lithium salt LiTFSI and 33 mg of hexamethylene diisocyanate, and 10 μL of dibutyltin dilaurate.

The mixture is homogenized, degassed under vacuum and then poured into a polypropylene Petri dish. The Petri dish is put somewhere flat, under ventilation so that the solvent evaporates.

Once dry, the film obtained is exposed to a temperature of 80° C. for crosslinking by reaction of the isocyanate functions with the hydroxyl functions.
Comparative For comparison, an electrolyte film based on non-crosslinked polycaprolactone is formed. For this purpose, 400 mg of the synthesized polycaprolactone is dissolved in 2 mL of tetrahydrofuran (THF), in the presence of 100 mg of lithium salt LiTFSI. The mixture is used in the form of a film, by solvent evaporation, in the conditions described above.

1.2. Characterization of the Electrolytes
Chemical Characterization—IR Spectrum

FIG. 1 shows the infrared spectra, of the electrolyte based on crosslinked polycaprolactone according to the invention ("crosslinked PCL:LiTFSI (4:1)") and of the electrolyte based on linear polycaprolactone (not crosslinked) ("PCL:LiTFSI (4:1)"), respectively.

Comparison of the IR spectra shows that there is formation of urethane bonds in the crosslinked polymer, which is evidence of the reaction between the isocyanate functions of the crosslinking organic molecule, and the hydroxyl functions of the polycaprolactone.

Thermomechanical Characterization of the Supramolecular Polymer Material

Thermomechanical characterization of the electrolyte materials was performed by dynamic mechanical analysis (DMA), using a Malvern Gemini 2 rheometer, with steel plate/plate geometry with temperature controlled by a Peltier element (−20° C.-180° C.).

The material is evaluated by DMA during a temperature scan under stress, subjecting the material to a shear strain at a frequency, called the stressing frequency, of 1 Hz and a shear strain of 0.5% for the electrolyte material based on non-crosslinked linear polycaprolactone and of 5% for the electrolyte material based on crosslinked polycaprolactone according to the invention.

Figure 2:
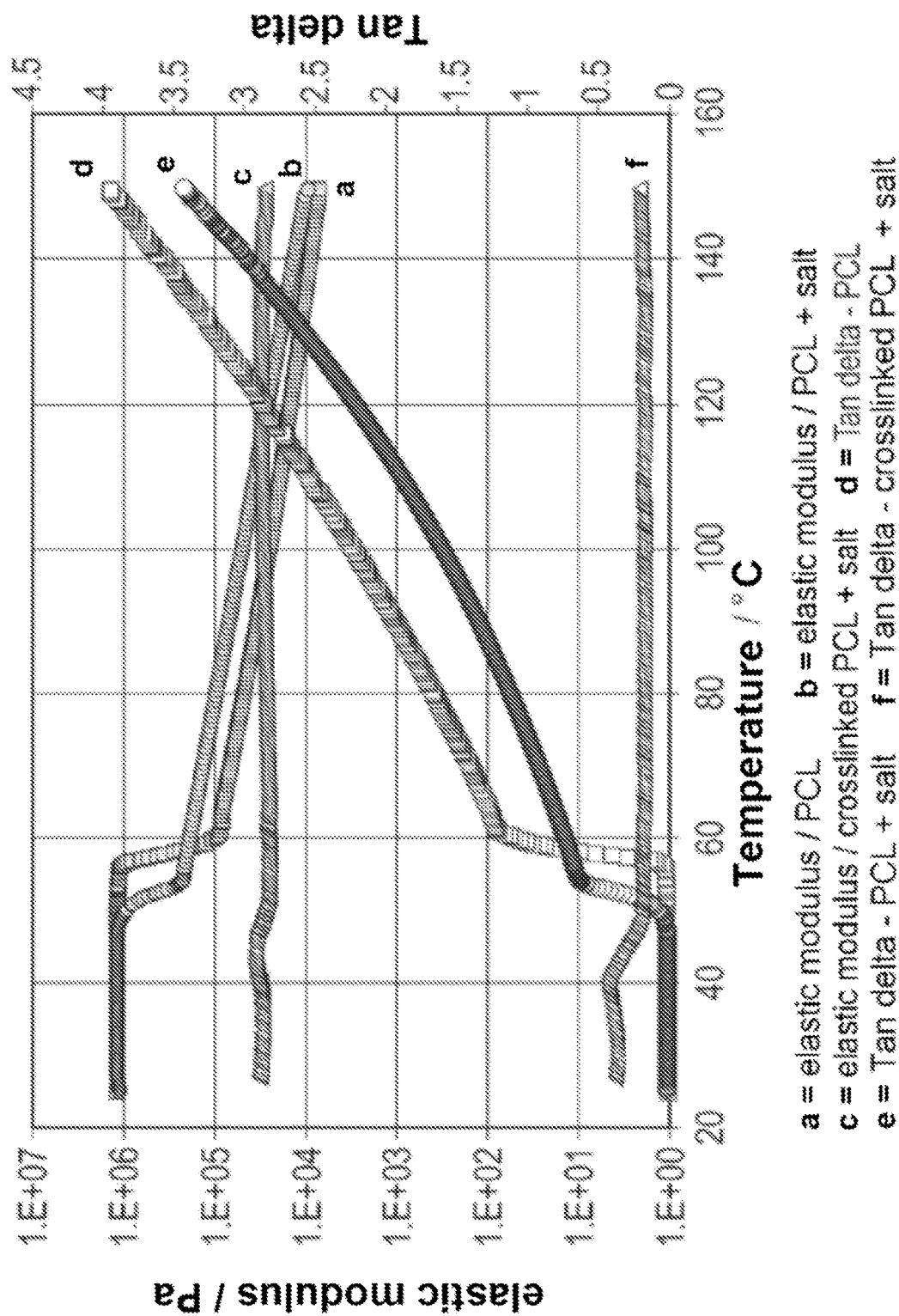
FIG. 2 presents the curves of the variation of the storage modulus G' and of the damping factor tan delta=G"/G' obtained by dynamic mechanical analysis (DMA) of the polycaprolactone material alone ("PCL"), of the electrolyte based on non-crosslinked polycaprolactone ("PCL+salt") not according to the invention and of the electrolyte based on crosslinked polycaprolactone according to the invention ("crosslinked PCL+salt"), prepared according to example 1.

FIG. 2 shows the variation of the storage modulus G' (also called "elastic modulus") and of the damping factor tan delta=G"/G' (which characterize the viscous part of the material) for the polycaprolactone material alone ("PCL"), for the electrolyte based on non-crosslinked polycaprolactone ("PCL+salt") not according to the invention and for the electrolyte based on crosslinked polycaprolactone according to the invention ("crosslinked PCL+salt").

DMA makes it possible to validate the absence of crystallinity in the solid electrolyte based on crosslinked polycaprolactone according to the invention. It also validates the absence of creep at high temperature (constant elastic modulus G').

Electrochemical Properties
Ionic Conductivity

Each of the electrolytes is mounted in a button cell, between two $Li^0$ electrodes, to obtain their ionic conductions as a function of temperature.

Figure 3:
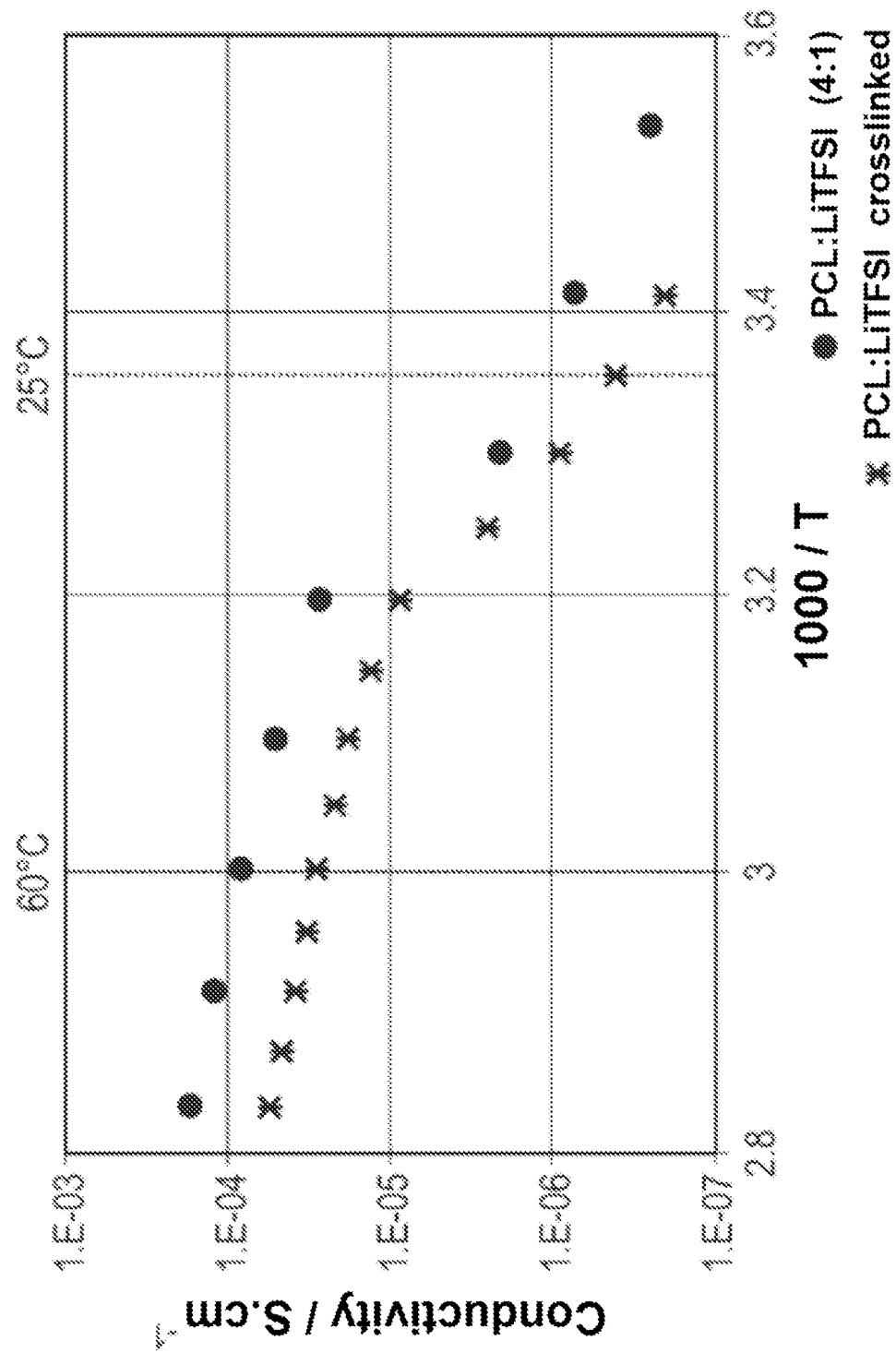
FIG. 3 shows the variation of the ionic conductivity (in S·cm$^{-1}$) as a function of temperature (1000/T, T being expressed in degrees Kelvin) for the electrolyte based on crosslinked polycaprolactone according to the invention ("crosslinked PCL:LiTFSI") and for the electrolyte based on non-crosslinked polycaprolactone ("PCL:LiTFSI (4:1)") not according to the invention, prepared according to example 1.

The results are shown in FIG. 3. The solid electrolyte according to the invention makes it possible to reach a conductivity of $3.10^{-5}$ S·cm$^{-1}$ at 60° C.

Electrochemical Stability

Each of the electrolytes is tested in a $Li^0$/electrolyte/stainless steel button cell.

Figure 4:
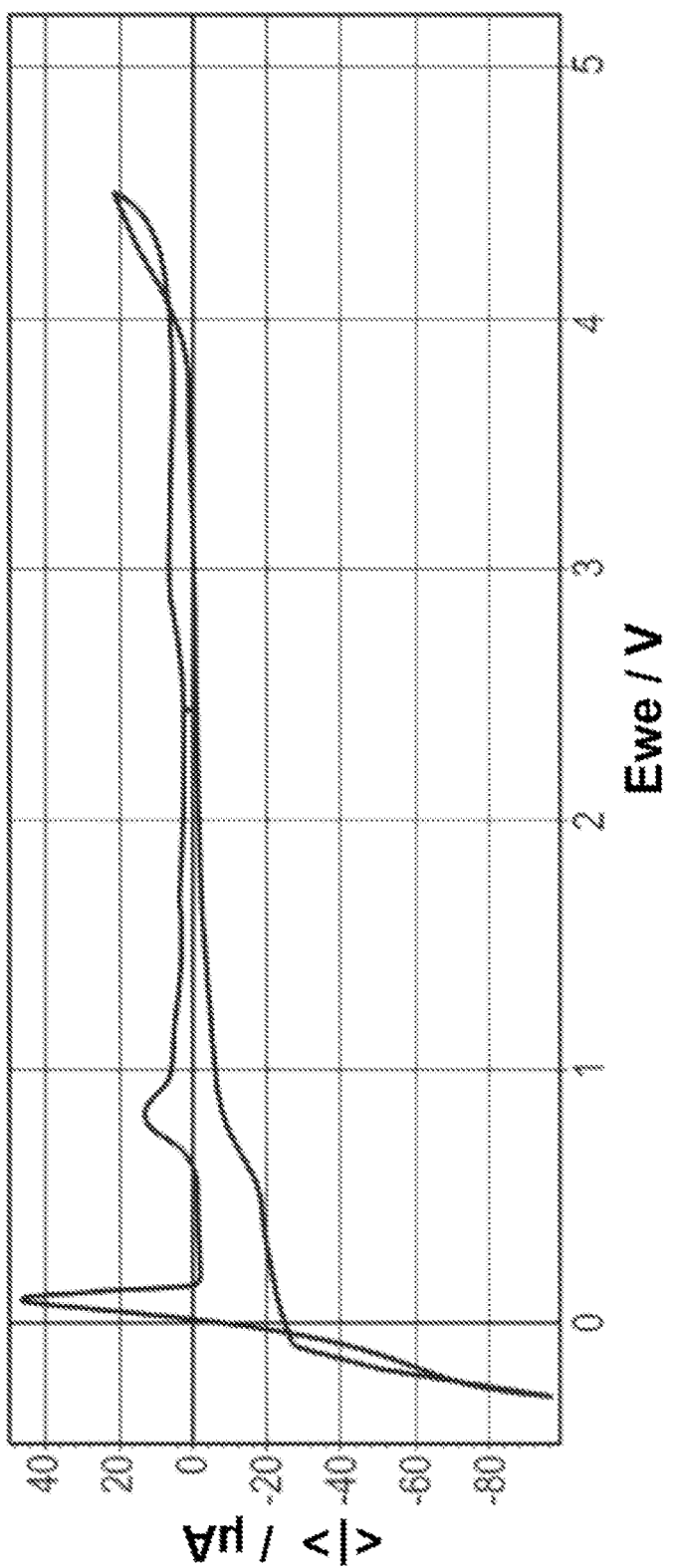
FIG. 4 shows the voltammogram obtained with the electrochemical set-up described in example 1, incorporating the electrolyte based on non-crosslinked polycaprolactone ("PCL:LiTFSI (4:1)") not according to the invention, prepared according to example 1 for a first cycle of potential scanning at 1 mV/s at a temperature of 80° C.
Figure 5:
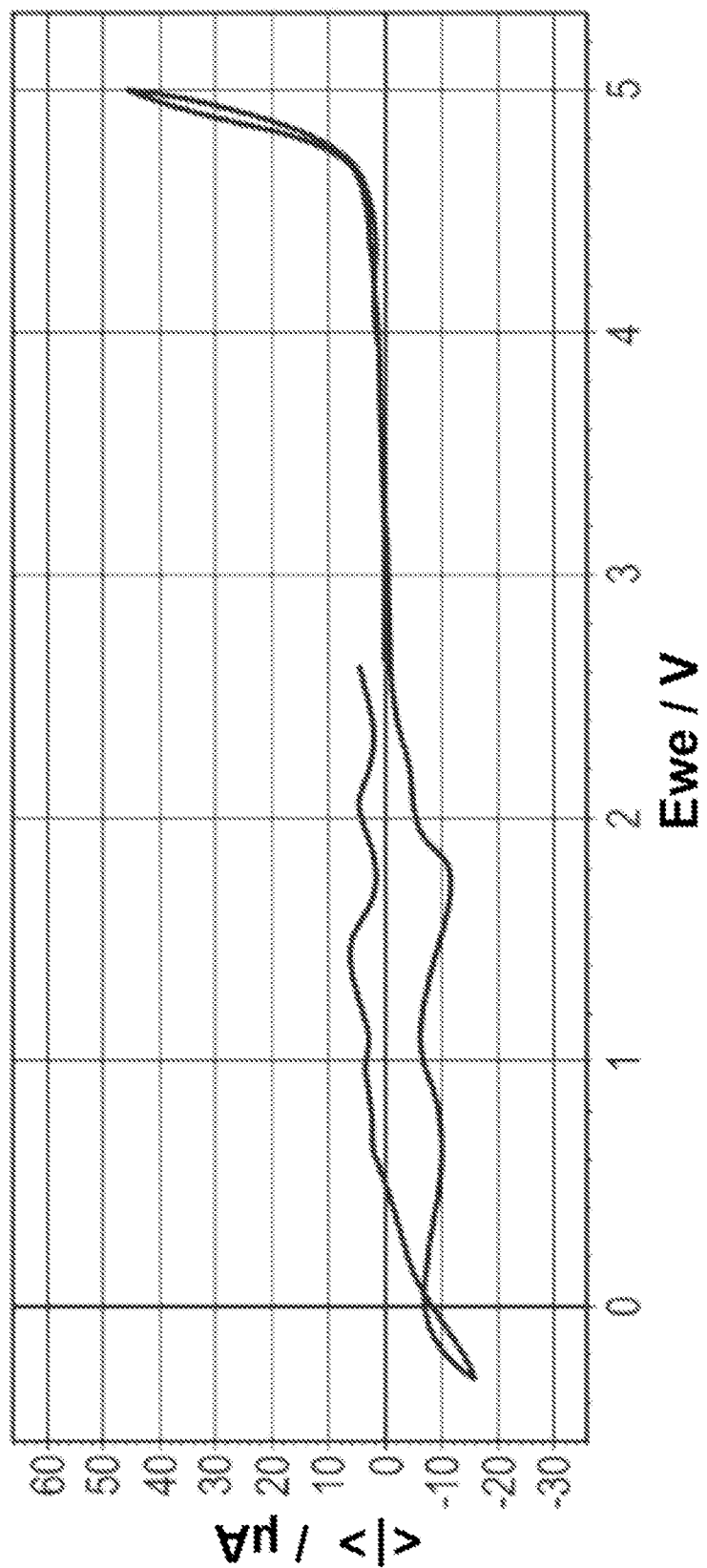
FIG. 5 shows the voltammogram obtained with the electrochemical set-up described in example 1, incorporating the electrolyte based on crosslinked polycaprolactone ("crosslinked PCL:LiTFSI (4:1)") according to the invention, prepared according to example 1 for a first cycle of potential scanning at 1 mV/s at a temperature of 80° C.

The curves of cyclic voltammetry obtained for the first scanning cycle, at a temperature of 80° C. for a scanning rate of 1 mV/s, with the electrolyte based on non-crosslinked polycaprolactone and of the electrolyte based on crosslinked polycaprolactone according to the invention, are shown in FIGS. 4 and 5, respectively.

The electrolyte based on linear polycaprolactone shows oxidation stability up to 4.1 V vs. $Li^0$/Li.

The electrolyte based on crosslinked polycaprolactone according to the invention is stable in oxidation up to 4.5 V vs. $Li^0$/Li.

Cycling in a Symmetric Cell Li vs Li

Each of the solid electrolytes is incorporated in a symmetric cell $Li^0$/electrolyte/$Li^0$.

Electrochemical tests are carried out in galvanostatic cycling, at different current densities per stage of 4 hours at a temperature of 60° C.

Figure 6:
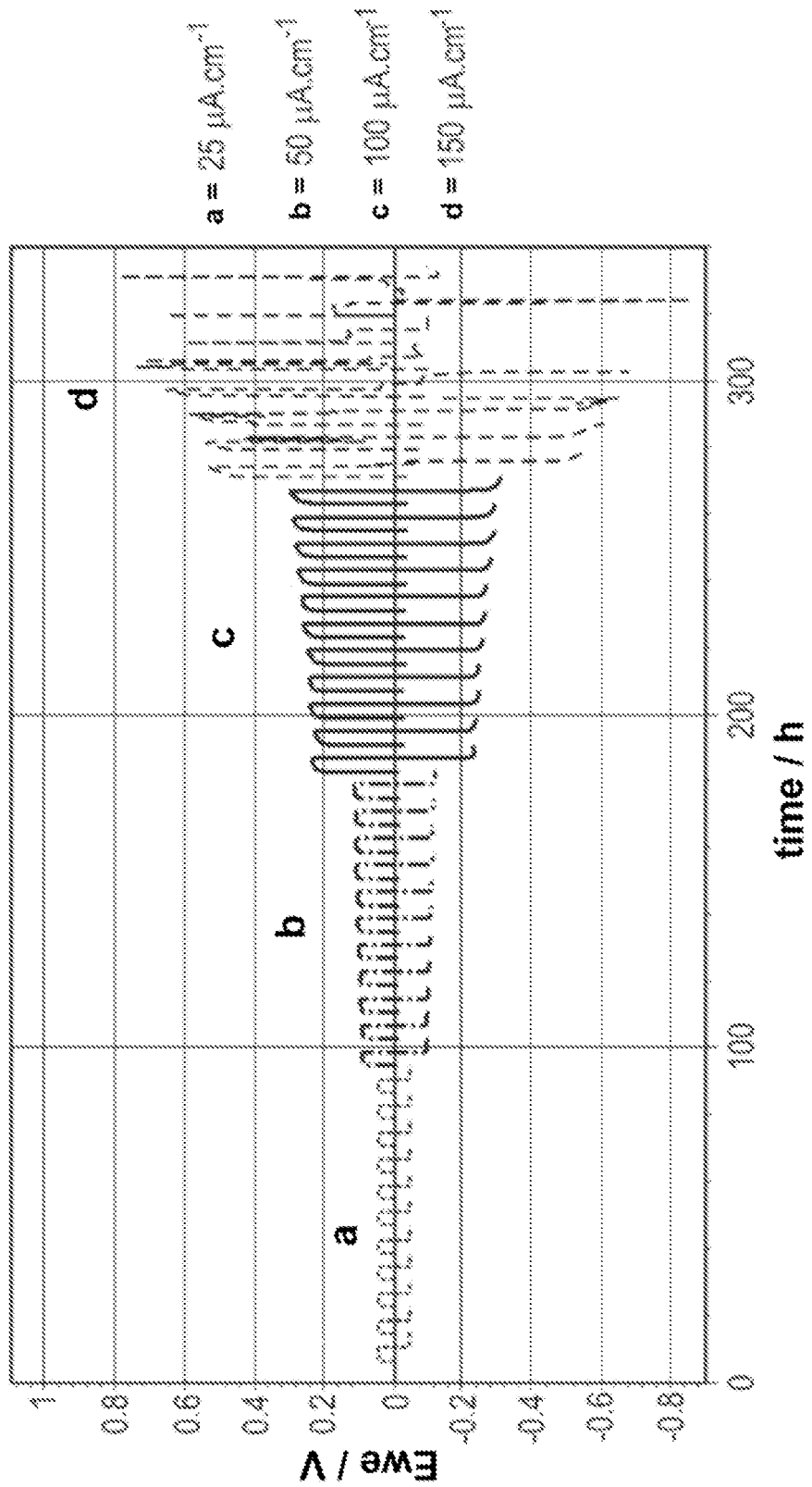
FIG. 6 shows the cycling curves in a symmetric cell $Li^0$/electrolyte/$Li^0$, using the electrolyte based on non-crosslinked polycaprolactone ("PCL:LiTFSI (4:1)"), as described in example 1.
Figure 7:
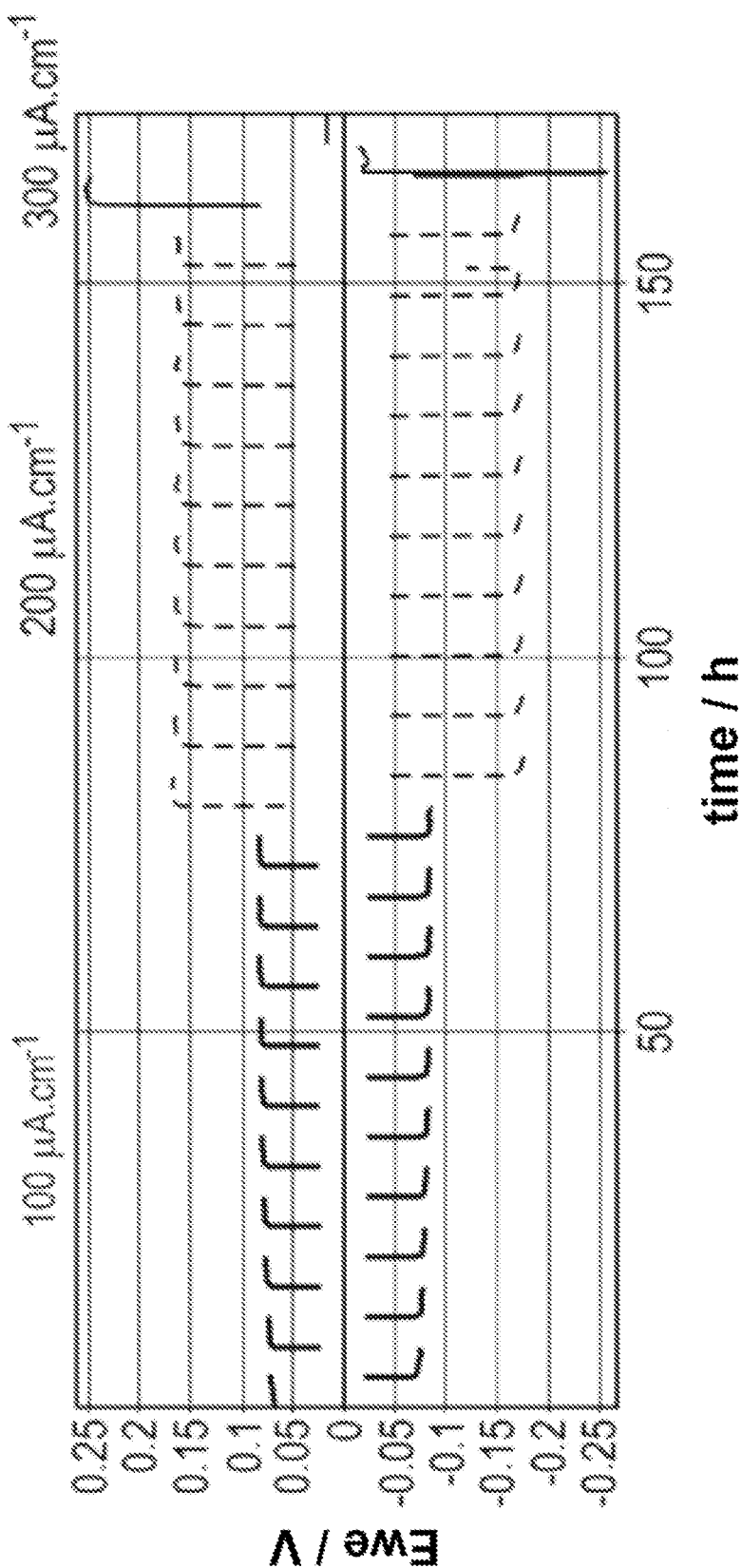
FIG. 7 shows the cycling curves in a symmetric cell $Li^0$/electrolyte/$Li^0$, using the electrolyte based on crosslinked polycaprolactone according to the invention ("crosslinked PCL:LiTFSI (4:1)"), as described in example 1.

The cycling curves obtained with the electrolyte based on non-crosslinked polycaprolactone ("PCL:LiTFSI (4:1)") and with the electrolyte based on crosslinked polycaprolactone according to the invention ("crosslinked PCL:LiTFSI (4:1)"), are shown in FIGS. 6 and 7, respectively.

Cycling in a Battery $Li^0$ vs. $LiNi_{1/3}Mn_{1/3}Co_{1/3}O_2$

Each of the solid electrolytes is incorporated in a battery $Li^0$ vs. $LiNi_{1/3}Mn_{1/3}Co_{1/3}O_2$. Electrochemical tests are carried out in galvanostatic cycling with a C/20 regime at a temperature of 60° C.

Figure 8:
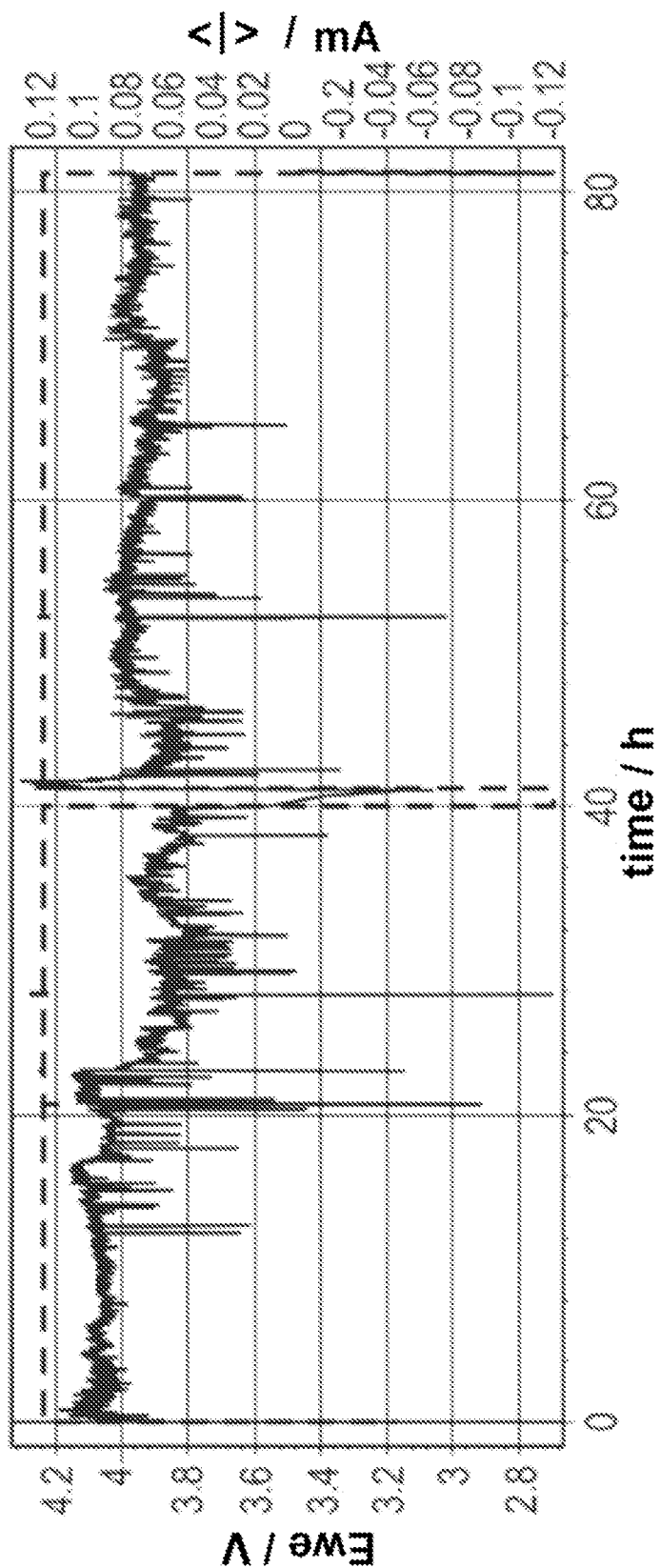
FIG. 8 shows the cycling curves in a battery $Li^0$ vs. $LiNi_{1/3}Mn_{1/3}Co_{1/3}O_2$ using the electrolyte based on non-crosslinked polycaprolactone ("PCL:LiTFSI (4:1)"), as described in example 1.

The cycling curve obtained with the electrolyte based on non-crosslinked polycaprolactone ("PCL:LiTFS1 (4:1)") is shown in FIG. 8. The electrolyte based on non-crosslinked polycaprolactone does not allow the battery to be charged effectively. Charging is heavily disturbed by lithium dendrite growth.

In contrast, the electrolyte based on crosslinked polycaprolactone according to the invention allows effective charging of the battery of 2.5 mAh with a capacity of 130 mAh·g$^{-1}$ in the first cycle at 60° C. in a C/20 regime.

Example 2

2.1. Preparation of the Solid Electrolytes
Preparation of the Polycaprolactone/Polytrimethylene Carbonate Copolymer Functionalized with Hydroxyl Functions A 50-mL flask is charged with 13.5 mg of glycerol ($1.47 \times 10^{-4}$ mol; 1 equivalent), 9.05 g of ε-caprolactone ($7.94 \times 10^{-2}$ mol; 540 equivalents), 0.90 g of trimethylene carbonate ($8.82 \times 10^{-3}$ mol; 60 equivalents), 100 mg of diphenyl phosphate ($4 \times 10^{-4}$ mol; 2.72 equivalents) and dissolved in 10 mL of toluene. The whole is placed under argon, with mechanical stirring, at 50° C. for 48 hours.

The mixture is cooled to room temperature, and then diluted with 50 mL of tetrahydrofuran (THF) before being precipitated in methanol (500 mL). After filtration, the precipitate is dried under vacuum at 40° C. for 48 hours.

Formation of the Film of Solid Electrolyte 400 mg of the synthesized copolymer is dissolved in 2 mL of tetrahydrofuran (THF) in the presence of 100 mg of lithium salt LiTFSI and 33 mg of hexamethylene diisocyanate and 10 μL of dibutyltin dilaurate.

The mixture is homogenized, degassed under vacuum and then poured into a polypropylene Petri dish. The Petri dish is put somewhere flat and under ventilation so that the solvent evaporates.

Once dry, the film obtained is placed at a temperature of 80° C. for crosslinking by reaction of the isocyanate functions with the hydroxyl functions.

Comparative

For comparison, an electrolyte film based on non-crosslinked polycaprolactone/polytrimethylene carbonate copolymer is formed.

For this purpose, 400 mg of the synthesized polycaprolactone/polytrimethylene copolymer is dissolved in 2 mL of tetrahydrofuran (THF), in the presence of 100 mg of lithium salt LiTFSI. The mixture is formed into a film, by solvent evaporation, in the conditions described above.

Figure 9:
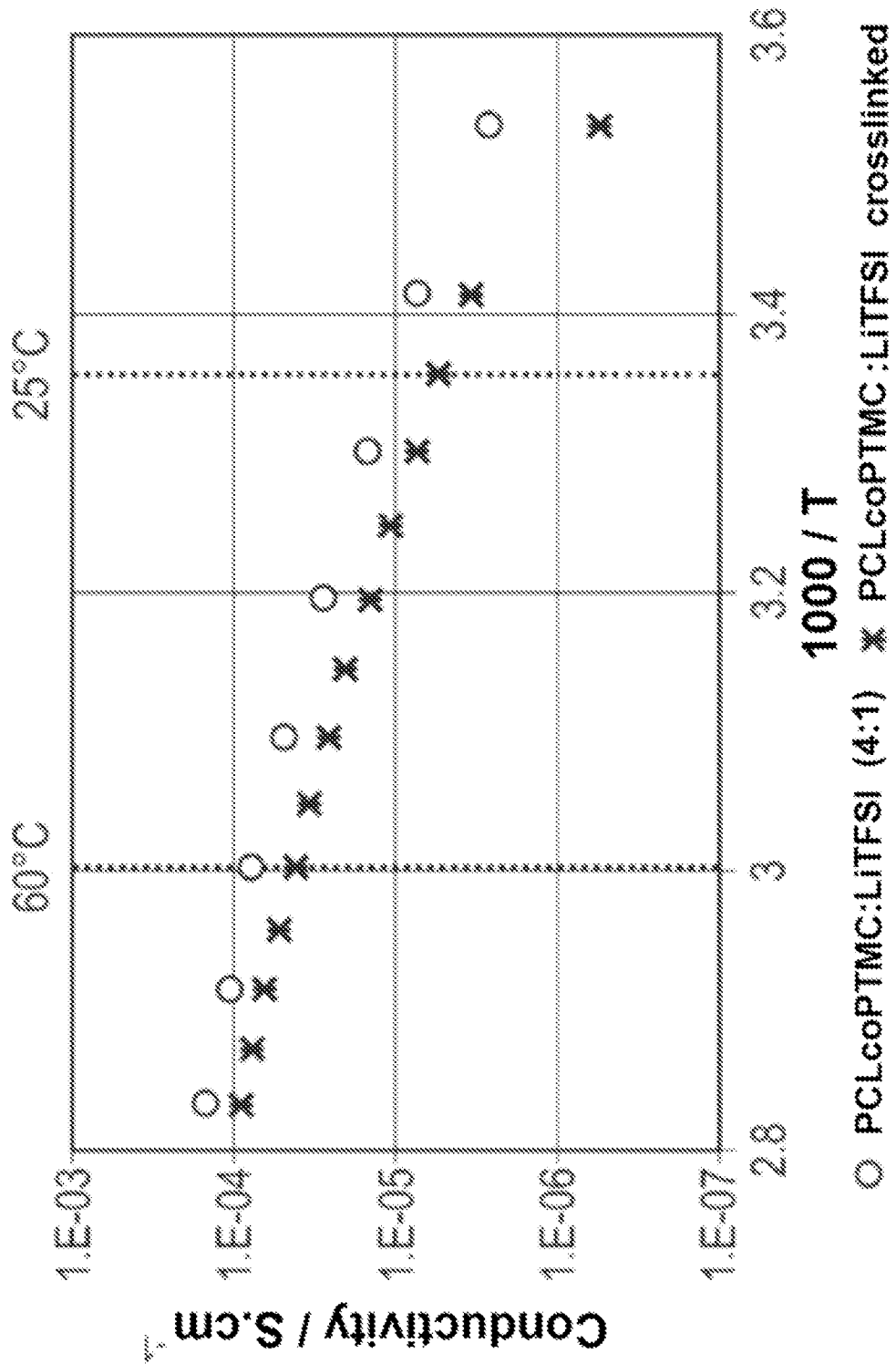
FIG. 9 shows the variation of the ionic conductivity (in $S \cdot cm^{-1}$) as a function of temperature (1000/T, T being expressed in degrees Kelvin) for the electrolyte based on crosslinked polycaprolactone/polytrimethylene carbonate copolymer according to the invention ("crosslinked PCLco-PTMC:LiTFSI") and for the electrolyte based on non-crosslinked polycaprolactone/polytrimethylene carbonate copolymer ("PCLcoPTMC:LiTFSI (4:1)") not according to the invention, prepared according to example 2.

2.2. Characterization and Performance of the Electrolytes
Electrochemical Properties The results in terms of ionic conductivity as a function of temperature, obtained in a button cell between two $Li^0$ electrodes, are shown in FIG. 9. The solid electrolyte according to the invention makes it possible to reach advantageous performance at lower temperature, i.e. a conductivity of $6.10^{-6}$ S·cm$^{-1}$ at 25° C.

Cycling in a Battery Li⁰ vs. LiNi$_{1/3}$Mn$_{1/3}$Co$_{1/3}$O$_2$

The solid electrolyte is incorporated in a battery Li⁰ vs. LiNi$_{1/3}$Mn$_{1/3}$Co$_{1/3}$O$_2$. Electrochemical tests are carried out in galvanostatic cycling with a C/20 regime at a temperature of 60° C.

The electrolyte based on crosslinked polycaprolactone/polytrimethylene carbonate copolymer (PCLcoPTMC) according to the invention allows effective charging of a battery of 2.5 mAh with a capacity of 80 mAh·g$^{-1}$ in the first cycle at 60° C. in a C/20 regime.

Example 3

Preparation of the Polyester (Polycaprolactone) Functionalized with Hydroxyl Functions A 50-mL flask is charged with 20 mg of pentaerythritol (1.47×10$^{-4}$ mol; 1 equivalent), 10 g of ε-caprolactone (8.77×10$^{-2}$ mol; 597 equivalents), 0.90 g of trimethylene carbonate (8.82×10$^{-3}$ mol; 60 equivalents), 100 mg of diphenyl phosphate (4×10$^{-4}$ mol; 2.72 equivalents) and dissolved in 10 mL of toluene. The whole is placed under argon, with mechanical stirring, at 50° C. for 48 hours.

The mixture is cooled to room temperature, and then diluted with 50 mL of tetrahydrofuran (THF) before being precipitated in methanol (500 mL). After filtration, the precipitate is dried under vacuum at 40° C. for 48 hours.

Formation of the Film of Solid Electrolyte 400 mg of the synthesized polycaprolactone is dissolved in 2 mL of tetrahydrofuran (THF) in the presence of 100 mg of lithium salt LiTFSI, 60 mg of methacryloyloxyethyl isocyanate and 5 mg of diphenyl(2,4,6-trimethylbenzoyl) phosphine oxide.

The mixture is homogenized, dried under vacuum and then heated to a temperature of 80° C. for reaction of the isocyanate functions with the hydroxyl functions.

This electrolyte is formed (by hot pressing or by extrusion), and then crosslinked under UV irradiation (80 W at a wavelength of 365 nm).

LIST OF DOCUMENTS CITED

[1] Mindemark, Journal of Power Sources 298 (2015) 166-170.
[2] Undin et al., Polymer 87 (2016) 17-25.

The invention claimed is:

1. A method for preparing a film of solid polymer electrolyte, the method comprising:
    (a) forming a dry film from a composition without sufficient external heat and/or UV radiation to crosslink a (co)polymer in the composition; and
    (b) subjecting the dry film to sufficient external heat and/or UV radiation to crosslink of the (co)polymer to form the film of solid polymer electrolyte, forming more than 50 wt. % of crosslinked polymer network in the solid polymer electrolyte, based on total solid electrolyte weight,
    wherein the composition in the forming (a) comprises:
    a solvent;
    the (co)polymer, comprising, in ring-opened polymerized form, a lactone with five to eight ring members and/or a cyclic carbonate with five to eight ring members, and having free terminal hydroxyl functions;
    an organic crosslinking agent, comprising a first and second reactive function, the organic crosslinking agent being suitable to allow, under the external heat and/or UV radiation, crosslinking of the (co)polymer by reaction with the free hydroxyl functions of the (co)polymer;
    an ionic conductive salt; and
    optionally, if the organic crosslinking agent comprises a photosensitive reactive function, a photoinitiator,
    wherein the (co)polymer in the composition is obtained by ring-opening (co)polymerizing the lactone and/or cyclic carbonate in an environment comprising an organic initiator comprising a first, second, and third hydroxyl function.

2. The method of claim 1, wherein the ionic conductive salt is a lithium salt.

3. The method of claim 1, wherein the solvent comprises acetone and/or tetrahydrofuran.

4. The method of claim 1, wherein the forming (a) comprises:
    forming the dry film on a surface of a substrate, by casting or coating, followed by drying to evaporate the solvent; and
    optionally, separating the dry film from the substrate to form a self-supporting film.

5. The method of claim 1, wherein the lactone and/or cyclic carbonate has formula (I):

wherein
X is C or O, and
n is an integer in a range of from 1 to 3, and
wherein the lactone and/or cyclic carbonate is optionally substituted, on one or more of the ring carbon atoms, with one or more substituents independently selected from alkyl groups, halogen atoms, hydroxyl function, carboxyl function, —SO$_3$H, amine, and (meth)acrylate groups, the alkyl groups optionally bearing one or more groups selected from halogen atoms, hydroxyl functions, carboxyl functions, —SO$_3$H, and amine.

6. The method of claim 1, wherein the (co)polymer in the composition is obtained by ring-opening (co)polymerizing the lactone and/or cyclic carbonate in the environment comprising the organic initiator and a (co)polymerization catalyst.

7. The method of claim 6, wherein the (co)polymerization catalyst comprises a substituted phosphorus-comprising compound or a metal compound.

8. The method of claim 1, wherein the lactone used in the (co)polymer has formula (II):

wherein n is an integer in a range of from 1 to 3,
wherein the lactone is optionally substituted on one or more of the ring carbon atoms with one or more substituents independently selected from alkyl groups, halogen atoms, hydroxyl function, carboxyl function, —SO₃H, amine, and (meth)acrylate groups, the alkyl groups optionally bearing one or more groups selected from halogen atoms, hydroxyl functions, carboxyl functions, —SO₃H, and amine.

9. The method of claim 8, wherein the lactone is used and comprises ε-caprolactone.

10. The method of claim 1, wherein the (co)polymer in the composition has a number-average molecular weight greater than or equal to 3 kg/mol.

11. The method of claim 10, wherein the number-average molecular weight of the (co)polymer is in a range of from 9 to 120 kg/mol.

12. The method of claim 1, wherein the crosslinking agent has formula (IV):

F1-E-G        (IV), wherein
F1 is a first function able to interact, under heat, with at least one of the free hydroxyl functions on the (co)polymer to form a covalent bond,
E is an organic spacer group, and
G is either a second function F1, able to interact, under heat, with at least one of the free hydroxyl functions on the (co)polymer to form a covalent bond, identical to or different from the first function F1, or a photosensitive function F2, reactive under UV radiation.

13. The method of claim 12, wherein F1 is an isocyanate function.

14. The method of claim 12, wherein E is a C2 to C8 linear or branched alkylene group.

15. The method of claim 1, wherein the organic crosslinking agent comprises:
a thermo-activatable organic molecule, comprising first and second functions F1, each of the functions F1 being able to interact, under heat, with at least one of the free hydroxyl functions on the (co)polymer to form a covalent bond; and/or
a photo-activatable organic molecule, comprising a reactive function F1 able to interact, under heat, with at least one of the free hydroxyl functions on the (co)polymer to form a covalent bond, and a photosensitive function F2, reactive under UV radiation, in the presence of at least one photoinitiator.

16. The method of claim 15, wherein the organic crosslinking agent comprises the first function F1, and the photosensitive function F2.

17. The method of claim 16, wherein the organic crosslinking agent is an organic molecule comprising an isocyanate function and an ethylenic unsaturation.

18. The method of claim 16, wherein the composition further comprises the photoinitiator, and
wherein the photoinitiator comprises a phosphine oxide.

19. The method of claim 15, wherein the crosslinking agent is an organic molecule comprising the first and second functions F1.

20. The method of claim 19, wherein the organic crosslinking agent comprises an aliphatic diisocyanate.

21. The method of claim 19, wherein the crosslinking in the subjecting (b) comprises bringing the dry film to a temperature sufficient to reaction of the first and second functions F1, with at least one of the free hydroxyl functions of the (co)polymer.

22. The method of claim 19, wherein the composition further comprises a coupling catalyst suitable for a coupling reaction between the hydroxyl function and the first and/or second function F1.

23. The method of claim 22, wherein the crosslinking in the subjecting (b) comprises:
(b1) optionally, if the first and/or second functions F1 did not react during forming of the dry film, with the hydroxyl functions of the (co)polymer, bringing the dry film to a temperature sufficient to interact the first and/or second functions F1, with at least one of the free hydroxyl functions; and
(b2) exposing the dry film to UV radiation sufficient to activate the photosensitive function F2, either consecutively, in that order, or simultaneously.

24. A film of solid polymer electrolyte, comprising:
a crosslinked polymer network comprising (i) a crosslinked (co)polymer comprising, in ring-opened polymerized form, a lactone with five to eight ring members and/or a cyclic carbonate with five to eight ring members, and (ii) an ionic conductive salt,
wherein more than 75 wt. % of the solid polymer electrolyte is the crosslinked polymer network, based on total solid electrolyte weight, and
wherein the (co)polymer is obtained before crosslinking by (co)polymerizing the lactone and/or cyclic carbonate in an environment comprising an organic initiator comprising a first, second, and third hydroxyl function.

25. The film of claim 24, wherein the lactone and/or cyclic carbonate used for the (co)polymer has formula (I)

wherein
X is C or O, and
n is 0, 1, 2, or 3, and
wherein the lactone and/or cyclic carbonate is optionally substituted, on one or more of the ring carbon atoms, with one or more alkyl groups, halogen atoms, hydroxyl function, carboxyl functions, —SO₃H, amine, and/or (meth)acrylate groups, the alkyl groups optionally bearing one or more halogen atoms, hydroxyl functions, carboxyl functions, —SO₃H, and/or amines.

26. The film of claim 24, having a thickness in a range of from 10 to 100 μm.

27. A method of preparing an electrochemical system, the method comprising:
including in the electrochemical system a crosslinked polymer network comprising (i) a crosslinked (co)polymer comprising, in ring-opened polymerized form, a lactone with five to eight ring members and/or a cyclic carbonate with five to eight ring members, and (ii) an ionic conductive salt in the electrochemical system, formed into a solid polymer electrolyte comprising more than 75 wt. % of the crosslinked polymer network, based on total solid electrolyte weight, and
wherein the (co)polymer in the crosslinked polymer network is obtained before crosslinking by ring-opening (co)polymerizing the lactone and/or cyclic carbonate in an environment comprising an organic initiator comprising a first, second, and third hydroxyl function.

28. An electrochemical system, comprising:
a solid polymer electrolyte film comprising a crosslinked polymer network comprising (i) a crosslinked (co)polymer comprising, in ring-opened polymerized form, a lactone with five to eight ring members and/or a cyclic carbonate with five to eight ring members, and (ii) an ionic conductive salt,
wherein more than 75 wt. % of the solid polymer electrolyte film is the crosslinked polymer network, based on total solid electrolyte weight, and
wherein the (co)polymer in the crosslinked polymer network is obtained before crosslinking by ring-opening (co)polymerizing the lactone and/or cyclic carbonate in an environment comprising an organic initiator comprising a first, second, and third hydroxyl function.

29. The electrochemical system of claim 28, which is a lithium battery.

* * * * *